INVENTORS
A. Walz +
BY R. Ostreicher
Gustav H. Emery
Atty.

United States Patent Office 2,977,488
Patented Mar. 28, 1961

2,977,488

CIRCUIT ARRANGEMENT FOR THE CONTROL OF DIRECT CURRENT MOTORS

Alfred Walz, am Kurzarm 7, Emmendingen, Germany, and Robert Ostreicher, Haus 272, Freiamt Reichenbach, Germany Filed Sept. 28, 1956, Ser. No. 612,674

Claims priority, application Germany Sept. 29, 1955

4 Claims. (Cl. 307—105)

The invention relates to a circuit arrangement for the loss-free control of the input of an electric motor fed from a source of direct current, and in particular to the loss-free power control of an electric trolley fed from an accumulator battery. Circuit arrangements for the loss-free control of the input of an electric motor fed from a source of direct current are known in which the use of a rotary switch is provided which is controlled in relation to the ratio of its contact making times to its circuit breaking times, whereby the rotary switch is so constructed that it has a control cam with an inclined ascending circuit making shoulder and an inclined descending circuit breaking flank. In such circuit arrangements the question of freedom from sparking of the periodically operating switch and also the question of the smooth running of the motor, especially the uniform, shock-free starting up of the motor, are important factors.

At the same time it is customary to provide parallel to the circuit breaker a condenser of suitable size, preferably an electrolytic condenser.

If in such a case the contact path of the circuit breaker is interrupted, the condenser will be charged until it is under the differential potential between the battery voltage and the voltage induced in the motor as it continues to run. This charging operation requires a certain time so that the contacts of the rotary switch will have moved a considerable distance apart before the condenser arranged parallel to the contact path has accumulated a higher potential so that no sparking can occur.

If the switch is then again closed, the condenser discharges over the contact path of the switch, the energy stored in the condenser being thereby almost completely used up in the ohm resistance of the contact path. This takes place with very high currents and consequently an undesirably high thermal stressing of the contact path of the rotary switch results.

Furthermore, it is found in the case of such circuit arrangements that, particularly when the motor is still stationary, the current impulse occurring on the contact-making of the rotary switch, is very great. This current impulse added to the discharge current impulse of the condenser increases its disadvantageous effect.

To avoid these disadvantages the circuit arrangement according to the invention is so constructed that the operating current fed to the motor to be controlled and the discharge current from the condenser on the closing of the switch, each flows through at least one inductance.

According to a further feature of the invention, the circuit connecting the condenser with the contact path of the rotary switch is transformatorily connected, preferably using an autotransformer or an impedance with mid-point terminal, with the feed circuit of the motor in such a manner that, when the switch is closed, a considerable portion of the energy accumulated in the condenser is fed to the motor. Consequently the energy stored in the condenser is not dissipated entirely in the contact path of the switch.

In yet another arrangement, a rectifier is provided between the impedance tap or terminal which leads to the condenser and the contact of the circuit breaker is connected to the impedance, which rectifier allows the current flowing through the winding when the contact path is closed to continue to flow when the contact path of the switch is interrupted.

On the closing of the contact path, the rectifier path is ineffective and the charged condenser discharges relatively slowly over the impedance connected to the contact path. It is then always possible to employ a sufficiently large impedance because otherwise when opening the contact path, the interruption of the current flowing through the impedance would cause a high induced electromotive force in the impedance which would affect the extinguishing effect of the condenser. The provision of the rectifier, however, prevents the formation of an induced electromotive force on the said winding of the impedance, in that it allows the impedance current to continue to flow. Consequently the effect of the condenser in preventing the occurrence of break-sparking on the condenser path is not impaired.

According to another circuit arrangement, the consumer current is only conducted over one partial winding of the impedance whereas one of the condenser armatures is connected to the other partial winding.

For carrying out the invention a switch in which the period of current flow is adjustable, is required, which switch is controlled by a cam disk effecting rapid opening and relatively slow closing of the contact path at switching frequencies of about 10 to 20 cycles.

A switch construction of this type also constitutes the subject matter of the invention. The invention is illustrated diagrammatically by way of example in several figures of the accompanying drawings, in which Fig. 1 shows the parallel arrangement of a condenser on the circuit-breaker;

Figure 1:
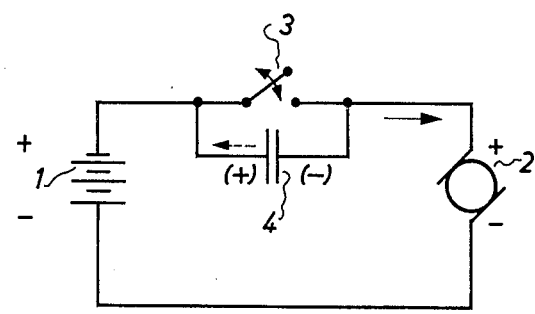

In the known circuit arrangement according to Fig. 1, 1 designates the accumulator battery which feeds the electric motor 2 over the rotary switch 3. With the object of power control the ratio of the contact making times to the circuit breaking times of the switch 3 is variable as desired within certain limits (spasmodic control).

For the purpose mentioned at the outset, a condenser 4 is connected in parallel to the contact path of the rotary switch 3. The full-line arrow represents the condenser current whereas the broken-line arrow indicates the discharge current of the condenser 4 resulting on the reclosing of the contact path 3.

Figure 2:
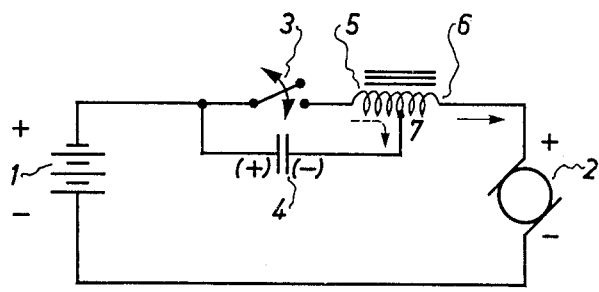
Fig. 2 shows a form of construction according to the invention with transformatory coupling of the condenser circuit and the motor circuit.

In the form of construction illustrated in Fig. 2, an impedance 5, 6 with a mid-point tap or terminal 7 is provided. The condenser 4 is connected up to the mid-point terminal 7. The feed current of the motor 2 flows in series through the two halves 5 and 6 of the impedance. When the switch 3 is open a voltage of the polarity indicated forms on the condenser 4. If the switch 3 is closed, the condenser 4 discharges only partly over the contact path. To a considerable extent, however, its energy is fed to the circuit containing the motor 2.

It is not necessary to use an impedance with mid-point terminal in the circuit arrangement. The two windings 5 and 6 can be of different dimensions. A transformer with separate primary and secondary coils can also be employed.

The transformatory coupling of the capacitive current circuit for spark-suppression with the consumer circuit may also be advisable if the consumer is not an electric motor but any kind of ohm resistance and when it is a question of an uncontrolled circuit-breaker.

Moreover, it may be advisable to arrange another condenser parallel to the motor 2, which likewise assists in the spark-suppression and effects a smooth running of the motor.

Figure 3:
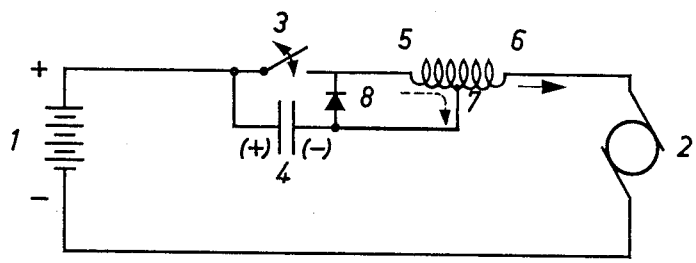
Fig. 3 is a form of construction similar to that of Fig. 2, in which a rectifier is provided for compensating the impedance current which flows through the half of the impedance facing the contact path.

In the form of construction illustrated in Fig. 3, an impedance 5, 7, 6 is arranged between the condenser path of the rotary switch 3 and the electric motor 2, the tapping terminal 7 of this impedance being connected to one of the armatures of the condenser 4. The partial winding 5, 7 is bridged by a rectifier 8 which is so poled that on the opening of the switch 3 the current flowing into the partial winding 5, 7 is short-circuited. Therefore, on the opening of the switch 3 the spark extinguishing can act entirely through the condenser.

Figure 4:
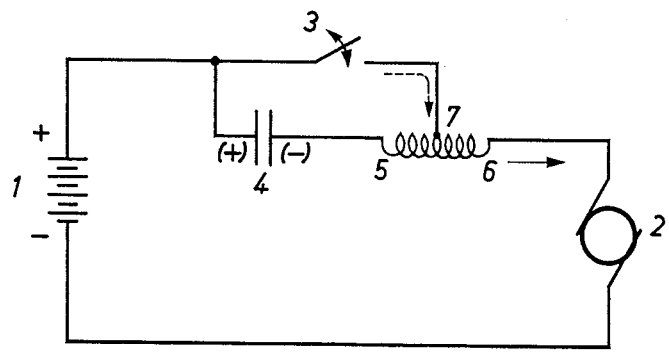
Fig. 4 is a modification of the circuit arrangement shown in Fig. 2.

In the circuit arrangement shown in Fig. 4, the consumer current is only conducted over the partial winding 7, 6 in that the tapping terminal 7 is connected to one contact point of the switch 3. Consumer current does not therefore flow through the partial winding 5, 7 when the switch contact 3 is closed.

Figure 5:
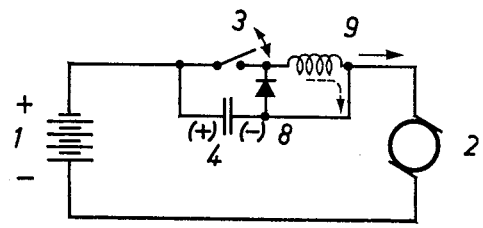
Fig. 5 shows a circuit arrangement corresponding to Fig. 3, in which the half of the impedance winding facing the consumer is omitted.

Another circuit arrangement is illustrated in Fig. 5. This differs from the circuit arrangement shown in Fig. 3 in that the section of the impedance located between the terminals 6 and 7 is omitted. The phenomenon dealt with in connection with Figs. 2 and 3 that the discharge current of the condenser 4 gives up power to the consumer 2 and is thus attenuated, is therefore not assured in this form of construction. Moreover in this circuit arrangement the charging of the condenser takes place so slowly that the contacts of the rotary switch 3 have already moved far apart before a considerable potential liable to produce sparking on the contact path has formed on the condenser 4. The condenser is then charged gradually in accordance with the voltage of the source of current 1 during the opening phase of the circuit breaker and is then discharged relatively slowly over the contact path and the impedance on the closing of the contact path 3.

We claim:

1. Circuit arrangement for the control of a motor, particularly of the motor of an electric trolley, the energy of which motor is supplied by a source of direct current, comprising a periodic rotary switch adjustable as regards the ratio of its contact-making periods in relation to its contact-breaking times and in series with the motor and a D.C. source of current, and a condenser arranged in parallel to the contact path of said switch, the primary winding of a transformer being provided in the circuit connecting the condenser with the contacts and in series with the contacts, the secondary winding of the said transformer being connected to the load circuit containing the motor.

2. Circuit arrangement as set forth in claim 1, wherein an iron core inductivity with mid-point tap terminal is provided for transformatorily coupling the circuit connecting the condenser with the contacts of the circuit-breaker with the feed circuit of the motor.

3. Circuit arrangement as set forth in claim 1, wherein the winding of the inductivity through which the consumer current and the current discharged by the condenser flow is bridged by a rectifier allowing the current flowing through the winding when the contact path is closed to continue to flow when the contact path is opened.

4. Circuit arrangement as set forth in claim 1, wherein the contact of the circuit-breaker remote from the condenser is connected with the tap terminal of the inductivity.

References Cited in the file of this patent

UNITED STATES PATENTS

| | | |
|---|---|---|
| 1,966,077 | Nyman | July 10, 1934 |
| 2,094,361 | Lee | Sept. 28, 1937 |
| 2,099,050 | Chamberlain | Nov. 16, 1937 |
| 2,106,058 | Neilson | Jan. 18, 1938 |
| 2,165,694 | Brown | July 11, 1939 |
| 2,032,743 | Evans | Mar. 3, 1956 |